United States Patent
Yoshino et al.

(10) Patent No.: US 11,912,272 B2
(45) Date of Patent: Feb. 27, 2024

(54) TARGET TRACK GENERATION APPARATUS, VEHICLE CONTROL APPARATUS, TARGET TRACK GENERATION METHOD, AND VEHICLE CONTROL METHOD

(71) Applicant: Mitsubishi Electric Corporation, Tokyo (JP)

(72) Inventors: Rei Yoshino, Tokyo (JP); Masaya Endo, Tokyo (JP); Yasuyoshi Hori, Tokyo (JP); Tetsuharu Hamada, Tokyo (JP); Takahiro Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 338 days.

(21) Appl. No.: 17/279,668

(22) PCT Filed: Oct. 30, 2018

(86) PCT No.: PCT/JP2018/040323
§ 371 (c)(1),
(2) Date: Mar. 25, 2021

(87) PCT Pub. No.: WO2020/090004
PCT Pub. Date: May 7, 2020

(65) Prior Publication Data
US 2021/0394755 A1 Dec. 23, 2021

(51) Int. Cl.
*B60W 30/10* (2006.01)
*B60W 30/165* (2020.01)

(52) U.S. Cl.
CPC .......... *B60W 30/10* (2013.01); *B60W 30/165* (2013.01); *B60W 2554/4041* (2020.02);
(Continued)

(58) Field of Classification Search
CPC .............. B60W 30/10; B60W 30/165; B60W 2554/4041; B60W 2556/10; B60W 2554/803; B60W 2554/404
See application file for complete search history.

(56) References Cited

U.S. PATENT DOCUMENTS

2017/0158175 A1* 6/2017 Fairfield ......... B60W 60/00276
2019/0061759 A1* 2/2019 Tomishima ........... B60W 40/06
(Continued)

FOREIGN PATENT DOCUMENTS

JP   2004-322916 A   11/2004
JP   2017-162410 A    9/2017

OTHER PUBLICATIONS

International Search Report of PCT/JP2018/040323 dated Dec. 11, 2018 [PCT/ISA/210].
(Continued)

*Primary Examiner* — Mahmoud S Ismail
*Assistant Examiner* — Gabriel Anfinrud
(74) *Attorney, Agent, or Firm* — Sughrue Mion, PLLC; Richard C. Turner

(57) ABSTRACT

In a target track generation apparatus, a subject vehicle reference preceding vehicle position calculator calculates a point group of subject vehicle reference preceding vehicle positions representing a history of a relative position of a preceding vehicle in a coordinate system using a current position of a subject vehicle as a reference. A target track generator generates a target track of the subject vehicle, based on the point group of the subject vehicle reference preceding vehicle positions. A correction target track generator generates a correction target track obtained by correcting the target track, based on the point group of the (Continued)

subject vehicle reference preceding vehicle positions or the target track, when it is determined that correction of the target track is necessary.

16 Claims, 16 Drawing Sheets

(52) U.S. Cl.
CPC ............... *B60W 2554/4044* (2020.02); *B60W 2554/803* (2020.02); *B60W 2556/10* (2020.02)

(56) References Cited

U.S. PATENT DOCUMENTS

2019/0361449 A1* 11/2019 Ueno .................. B60W 50/029
2021/0097336 A1* 4/2021 Schäfer ................ B60W 40/06

OTHER PUBLICATIONS

Communication dated Jun. 29, 2021, from the Japanese Patent Office in application No. 2020-554643.
Communication dated Oct. 18, 2023 issued by the State Intellectual Property Office of the P.R.China in application No. 201880098985.2.

* cited by examiner

F I G. 1
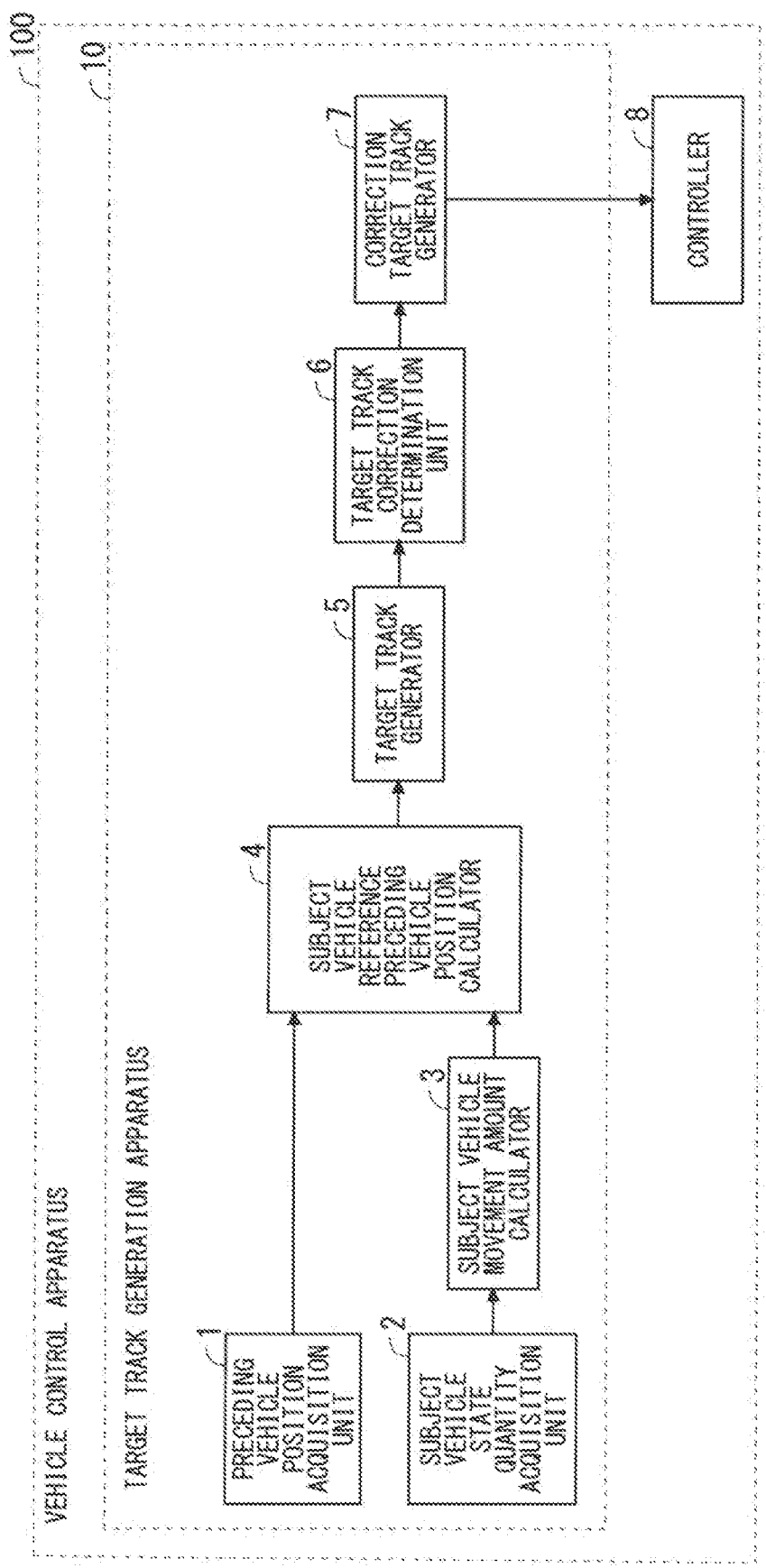

F I G. 1 8
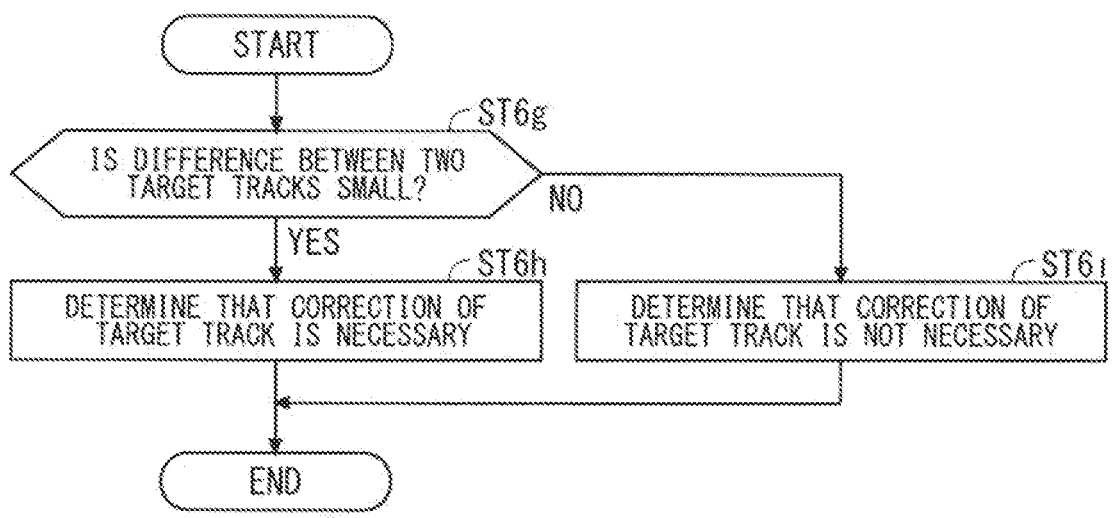

TARGET TRACK GENERATION APPARATUS, VEHICLE CONTROL APPARATUS, TARGET TRACK GENERATION METHOD, AND VEHICLE CONTROL METHOD

CROSS REFERENCE TO RELATED APPLICATIONS

This application is a National Stage of International Application No. PCT/JP2018/040323 filed on Oct. 30, 2018.

TECHNICAL FIELD

The present invention relates to a technology of generating a target track to cause a vehicle to follow a preceding vehicle (another vehicle traveling in front of the vehicle).

BACKGROUND ART

In recent years, an automated driving technology of causing a vehicle to travel by following a preceding vehicle has been under development. For example, Patent Document 1 listed below proposes a technology in which a travel track of a preceding vehicle is calculated based on a relative position of the preceding vehicle with respect to the subject vehicle, and the travel track is set as a target track for causing the subject vehicle to follow the preceding vehicle.

PRIOR ART DOCUMENTS

Patent Documents

Patent Document 1: Japanese Patent Application Laid-Open No. 2004-322916

SUMMARY

Problem to be Solved by the Invention

In the technology of Patent Document 1, the target track of the subject vehicle is calculated based on the relative position of the preceding vehicle. Thus, when detection errors are included in the relative position of the preceding vehicle, errors are generated in the target track of the subject vehicle. For example, when the preceding vehicle is traveling in a straight line (hereinafter simply referred to as "traveling straight"), the target track is supposed to have a linear shape. However, due to influence of the detection errors, a meandering target track may be calculated. When the subject vehicle is caused to follow such a target track, the number of times of steering of the subject vehicle is increased more than necessary, making it difficult to perform accurate and smooth control of the subject vehicle.

The present invention is made to solve the problems as described above, and has an object to reduce influence of detection errors of a relative position of the preceding vehicle over a target track of a subject vehicle.

Means to Solve the Problem

A target track generation apparatus according to the present invention includes: a preceding vehicle position acquisition unit configured to acquire a relative position of a preceding vehicle traveling in front of a subject vehicle; a subject vehicle state quantity acquisition unit configured to acquire a state quantity of the subject vehicle; a subject vehicle movement amount calculator configured to calculate a movement amount of the subject vehicle, based on the state quantity of the subject vehicle; a subject vehicle reference preceding vehicle position calculator configured to calculate a point group of subject vehicle reference preceding vehicle positions representing a history of the relative position of the preceding vehicle in a coordinate system using a current position of the subject vehicle as a reference, based on the relative position of the preceding vehicle and the movement amount of the subject vehicle; a target track generator configured to generate a target track of the subject vehicle, based on the point group of the subject vehicle reference preceding vehicle positions; a target track correction determination unit configured to determine whether or not correction of the target track is necessary, based on the point group of the subject vehicle reference preceding vehicle positions or the target track; and a correction target track generator configured to generate a correction target track obtained by correcting the target track, based on the point group of the subject vehicle reference preceding vehicle positions or the target track, when it is determined that correction of the target track is necessary.

Effects of the Invention

According to the present invention, with the target track calculated based on the relative position of the preceding vehicle being corrected based on the point group of the subject vehicle reference preceding vehicle positions or the target track, the influence of the detection errors of the relative position of the preceding vehicle over the target track can be reduced.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram illustrating a configuration of a vehicle control apparatus according to the first embodiment.

FIG. 18 is a flowchart of the target track correction determination according to the third embodiment.

DESCRIPTION OF EMBODIMENTS

First Embodiment

Figure 2:
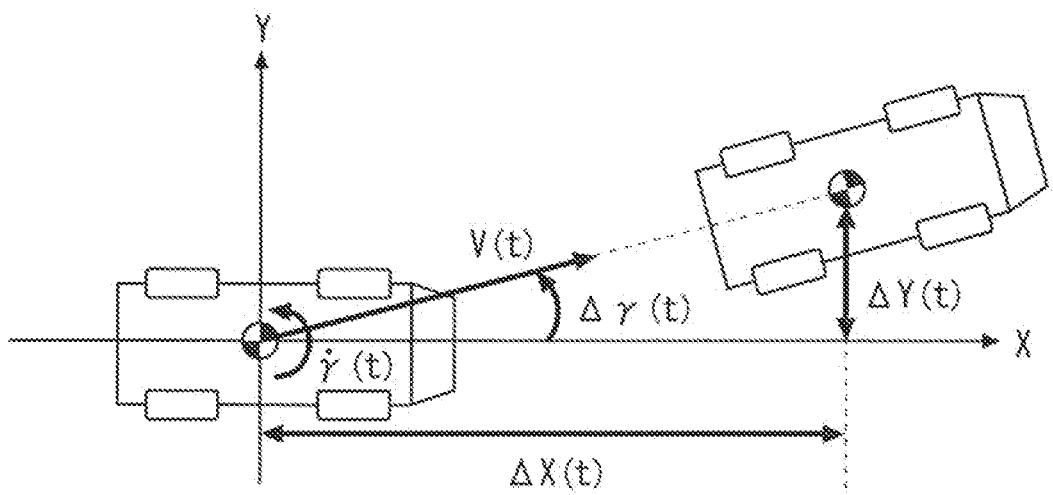
FIG. 2 is a diagram for describing a calculation method of a movement amount of a subject vehicle.

FIG. 1 is a block diagram illustrating a configuration of a vehicle control apparatus 100 according to the first embodiment of the present invention. As in FIG. 1, the vehicle control apparatus 100 includes a target track generation apparatus 10 including a preceding vehicle position acquisition unit 1, a subject vehicle state quantity acquisition unit 2 a subject vehicle movement amount calculator 3, a subject vehicle reference preceding vehicle position calculator 4, a target track generator 5, a target track correction determination unit 6, and a correction target track generator 7, and a controller 8. A vehicle equipped with the vehicle control apparatus 100 is hereinafter referred to as a "subject vehicle", and another vehicle that travels in front of the subject vehicle is hereinafter referred to as a "preceding vehicle".

The preceding vehicle position acquisition unit 1 acquires a relative position of the preceding vehicle with respect to the subject vehicle. More specifically, for example, the preceding vehicle position acquisition unit 1 acquires the relative position of the preceding vehicle by detecting a distance and a direction from the subject vehicle to the preceding vehicle by using an on-board sensor that can detect an object present around the subject vehicle, such as a front camera (a camera that captures an image in front of the subject vehicle) and a millimeter wave radar. Further, the preceding vehicle position acquisition unit 1 stores a certain time period of a history of the acquired relative positions of the preceding vehicle.

The subject vehicle state quantity acquisition unit 2 acquires a state quantity of the subject vehicle. In the present embodiment, the subject vehicle state quantity acquisition unit 2 acquires a velocity and a yaw rate of the subject vehicle as a subject vehicle state quantity that is necessary for the subject vehicle movement amount calculator 3 to calculate a movement amount of the subject vehicle. Note that information acquired by the subject vehicle state quantity acquisition unit 2 may be any information as long as the information can be used for the arithmetic of the movement amount of the subject vehicle, and for example, information such as rotation velocity of tires may be acquired instead of the velocity of the subject vehicle.

The subject vehicle movement amount calculator 3 calculates the movement amount of the subject vehicle, based on the subject vehicle state quantity acquired by the subject vehicle state quantity acquisition unit 2. For example, as in FIG. 2, a coordinate system in which the X-axis represents a traveling direction of the subject vehicle and the Y-axis represents a vehicle width direction of the subject vehicle is used. In this case, a subject vehicle movement amount (a movement amount $\Delta X(t)$ in the X direction, a movement amount $\Delta Y(t)$ in the Y direction, and a rotation angle (an amount of change in the traveling direction) $\Delta\gamma(t)$) at certain time t can be calculated according to the following expressions (1) to (3) by using a velocity $V(t)$ and a yaw rate $\dot{\gamma}(t)$ of the subject vehicle and sampling time $\Delta t$.

[Expression 1]

$$\Delta\gamma(t)=\dot{\gamma}(t)\Delta t \quad (1)$$

[Expression 2]

$$\Delta X(t)=V(t)\sin(\Delta\gamma(t))\Delta t \quad (2)$$

[Expression 3]

$$\Delta Y(t)=V(t)\cos(\Delta\gamma(t))\Delta t \quad (3)$$

The subject vehicle reference preceding vehicle position calculator 4 converts coordinates of the relative position of the preceding vehicle into coordinates of a coordinate system that uses the current position of the subject vehicle as a reference, based on the relative position of the preceding vehicle acquired by the preceding vehicle position acquisition unit 1 and the subject vehicle movement amount calculated by the subject vehicle movement amount calculator 3. The coordinate system using the current position of the subject vehicle as a reference is hereinafter referred to as a "subject vehicle reference coordinate system", and the relative position of the preceding vehicle converted into the subject vehicle reference coordinate system is hereinafter referred to as a "subject vehicle reference preceding vehicle position".

More specifically, the subject vehicle reference preceding vehicle position calculator 4 calculates a point group consisting of a history of the subject vehicle reference preceding vehicle positions, based on the history of the relative positions of the preceding vehicle stored in the preceding vehicle position acquisition unit 1 and the subject vehicle movement amount calculated by the subject vehicle movement amount calculator 3. For example, a coordinate system in which the X-axis represents the traveling direction of the subject vehicle and the Y-axis represents the vehicle width direction of the subject vehicle is used as the subject vehicle reference coordinate system, similarly to FIG. 2. In this case, the subject vehicle reference preceding vehicle position calculator 4 calculates the subject vehicle reference preceding vehicle position $(X_{mcr}(t), Y_{mcr}(t))$ by using the following expressions (4) and (5), which are coordinates conversion expressions in which the relative position of the preceding vehicle $(X_m(t), Y_m(t))$ stored in the preceding vehicle position acquisition unit 1 is shifted by the subject vehicle movement amount $(\Delta X(t), \Delta Y(t))$ obtained according to the expressions (2) and (3) and rotated by the rotation angle $(\Delta\gamma(t))$ obtained according to the expression (1) for each sampling time.

[Expression 4]

$$X_{mcr}(t)=\cos(-\Delta\gamma(t))X_m(t-1)+\sin(-\Delta\gamma(t))Y_m(t-1)-\Delta X(t) \quad (4)$$

[Expression 5]

$$Y_{mct}(t)=-\sin(-\Delta\gamma(t))X_m(t-1)+\cos(-\Delta\gamma(t))Y_m(t-1)-\Delta Y(t) \quad (5)$$

By performing the arithmetic of the expressions (4) and (5) for the whole history of the relative positions ($X_m(t)$, $Y_m(t)$) stored in the preceding vehicle position acquisition unit 1, the subject vehicle reference preceding vehicle position calculator 4 calculates the point group of the subject vehicle reference preceding vehicle positions ($X_{mct}(t)$, $Y_{mct}(t)$).

The target track generator 5 performs polynomial approximation on the point group of the subject vehicle reference preceding vehicle positions calculated by the subject vehicle reference preceding vehicle position calculator 4 to generate a travel track of the preceding vehicle, and uses the travel track as a target track of the subject vehicle. For example, when the target track is generated by performing cubic approximation on the point group of the subject vehicle reference preceding vehicle positions ($X_{mct}(t)$, $Y_{mct}(t)$), a target track $Y_3(t)$ at the certain time t can be expressed as in the following expression (6) in the subject vehicle reference coordinate system in which the X-axis represents the traveling direction of the subject vehicle and the Y-axis represents the vehicle width direction of the subject vehicle.

[Expression 6]

$$Y_3(t)=K_{03}(t)+K_{13}(t)X+K_{23}(t)X^2+K_{33}(t)X^3 \quad (6)$$

In the expression (6), $K_{03}(t)$ represents a term related to a lateral position (position in the vehicle width direction) with respect to a reference position of the subject vehicle, $K_{13}(t)$ represents a term related to inclination of the target track, $K_{23}(t)$ represents a term related to curvature of the target track, and $K_{33}(t)$ represents a term related to a curvature change rate of the target track. Note that actual curvature $K_{2r}(t)$ and curvature change rate $K_{3r}(t)$ of the target track at an X coordinate $X_{tt}$ on the target track can be calculated. according to the following expressions (7) and (8).

[Expression 7]

$$K_{2r}(t)=2K_{23}(t)+6K_{33}(t)X_{tt} \quad (7)$$

[Expression 8]

$$K_{3r}(t)=6K_{33}(t) \quad (8)$$

Further, when the target track obtained by performing quadratic approximation on the point group of the subject vehicle reference preceding vehicle positions ($X_{mct}(t)$, $Y_{mct}(t)$) is generated by considering that the target track is a curve without a curvature change, a target track $Y_2(t)$ can be expressed as in the following expression (9).

[Expression 9]

$$Y_2(t)=K_{02}(t)+K_{12}(t)X+K_{22}(t)X^2 \quad (9)$$

In the expression (9), $K_{02}(t)$ represents a term related to a lateral position with respect to the reference position of the subject vehicle, $K_{12}(t)$ represents a term related to inclination of the target track, and $K_{22}(t)$ represents a term related to curvature of the target track. Note that actual curvature $K_{2r}(t)$ of the target track can be calculated according to the following expression (10).

[Expression 10]

$$K_{2r}(t)=2K_{22}(t) \quad (10)$$

The target track correction determination unit 6 performs determination (hereinafter referred to as "target track correction determination") as to whether or not correction of the target track is necessary, based on the subject vehicle reference preceding vehicle positions calculated by the subject vehicle reference preceding vehicle position calculator 4 or the target track generated by the target track generator 5.

Figure 3:
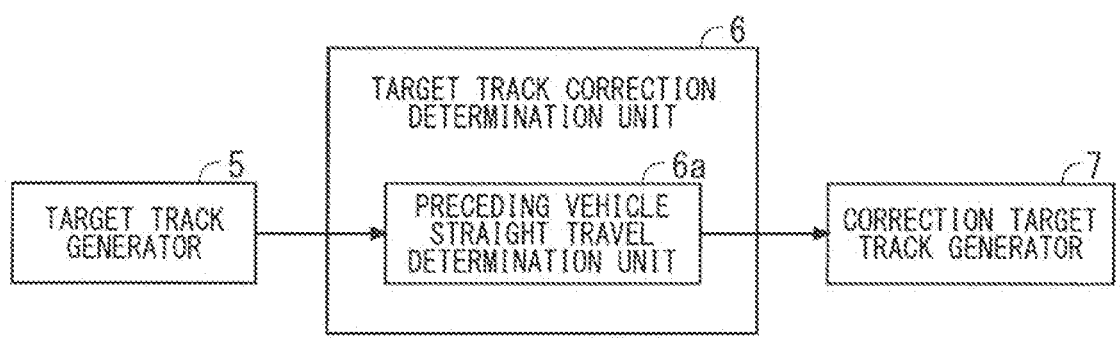
FIG. 3 is a block diagram illustrating a configuration of a target track correction determination unit of the vehicle control apparatus according to the first embodiment.

FIG. 3 is a block diagram illustrating a configuration of the target track correction determination unit 6 according to the first embodiment. The target track correction determination unit 6 according to the first embodiment includes a preceding vehicle straight travel determination unit 6a that performs determination (hereinafter referred to as "preceding vehicle straight travel determination") as to whether or not the preceding vehicle is traveling straight, and determines whether or not correction of the target track is necessary, based on results of the preceding vehicle straight travel determination by the preceding vehicle straight travel determination unit 6a.

Figure 4:
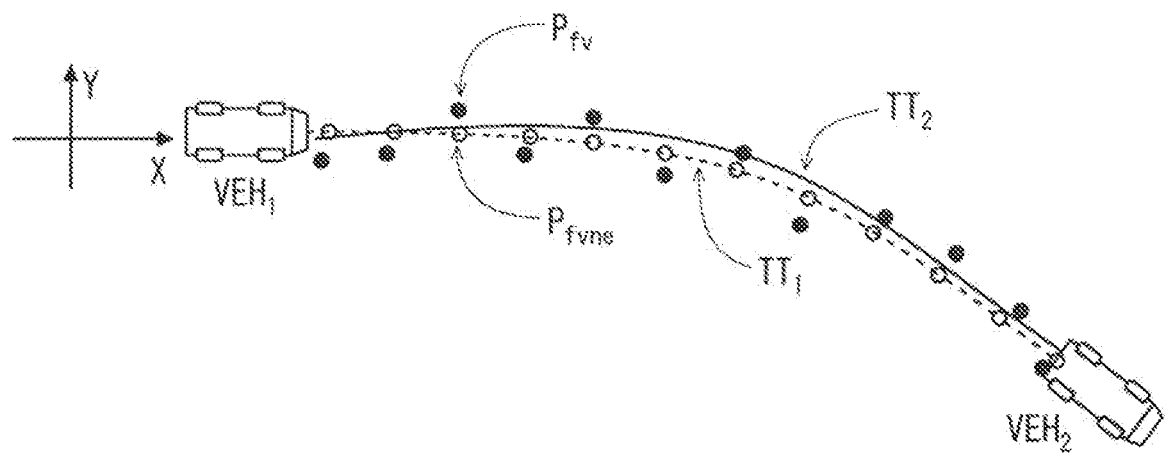
FIG. 4 is a diagram illustrating an example of a history of positions of a preceding vehicle followed by the subject vehicle and a target track.
Figure 5:
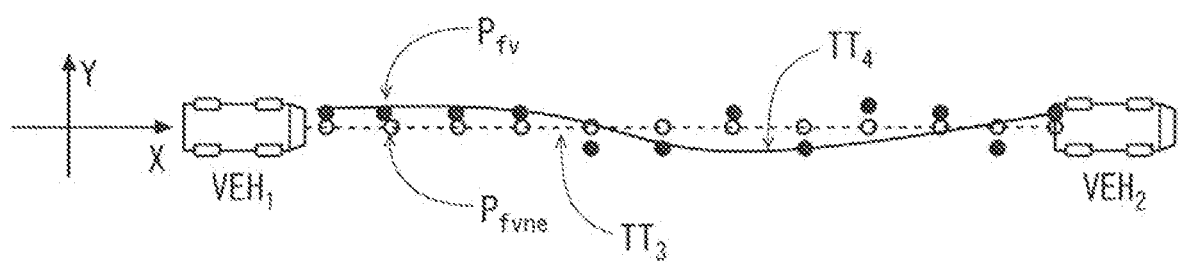
FIG. 5 is a diagram illustrating an example of a history of positions of a preceding vehicle followed by the subject vehicle and a target track.

The preceding vehicle straight travel determination performed by the preceding vehicle straight travel determination unit 6a. will be described. FIG. 4 and FIG. 5 illustrate examples of a history of positions (point group of the subject vehicle reference preceding vehicle positions) of a preceding vehicle $VEH_2$ followed by a subject vehicle $VEH_1$ and target tracks. FIG. 4 and FIG. 5 illustrate, as the point group of the subject vehicle reference preceding vehicle positions of the preceding vehicle $VEH_2$, a point group $P_{fvne}$ not including detection errors and a point group $P_{fv}$ including detection errors.

FIG. 4 is an example of a case in which the subject vehicle $VEH_1$ travels by following the preceding vehicle $VEH_2$ that travels while making a curve turn, and illustrates a target track $TT_1$, which is obtained by performing polynomial approximation on the point group $P_{fvne}$ not including detection errors, and a target track $TT_2$ (hereinafter also referred to as "target track including errors"), which is obtained by performing polynomial approximation oil the point group $P_{fv}$ including detection errors. FIG. 5 is an example of a case in which the subject vehicle $VEH_1$ travels by following the preceding vehicle $VEH_2$ traveling straight, and illustrates a target track $TT_3$ (hereinafter also referred to as "target track not including errors"), which is obtained by performing polynomial approximation on the point group $P_{fvne}$ not including detection errors, and a target track $TT_4$, which is obtained by performing polynomial approximation on the point group $P_{fv}$ including detection errors.

As in FIG. 4 and FIG. 5, a difference is generated between the target track including errors ($TT_2$ or $TT_4$) and the target track not including errors ($TT_1$ or $TT_3$) in both of the case of curve traveling and the case of straight traveling. Note that, in the case of curve traveling (FIG. 4), the magnitude of the detection errors with respect to the movement amount of the preceding vehicle in the vehicle width direction is small, and thus a significant difference is not easily generated between the shape of the target track including errors $TT_2$ and the shape of the target track not including errors $TT_1$. On the other hand, in the cose of straight traveling (FIG. 5), the magnitude of the detection errors with respect to the movement amount (≈0) of the preceding vehicle in the vehicle width direction is large, and thus a difference between the shape of the target track including errors $TT_4$ and the shape of the target track not including errors $TT_3$ is relatively large. Hence, it can be said that the need for performing correction of the target track is low in the case of curve traveling, whereas the need is high in the case of straight traveling.

Thus, when the preceding vehicle straight travel determination unit 6a determines that the preceding vehicle is traveling straight, the target track correction determination unit 6 according to the first embodiment determines that correction of the target track is necessary.

Figure 6:
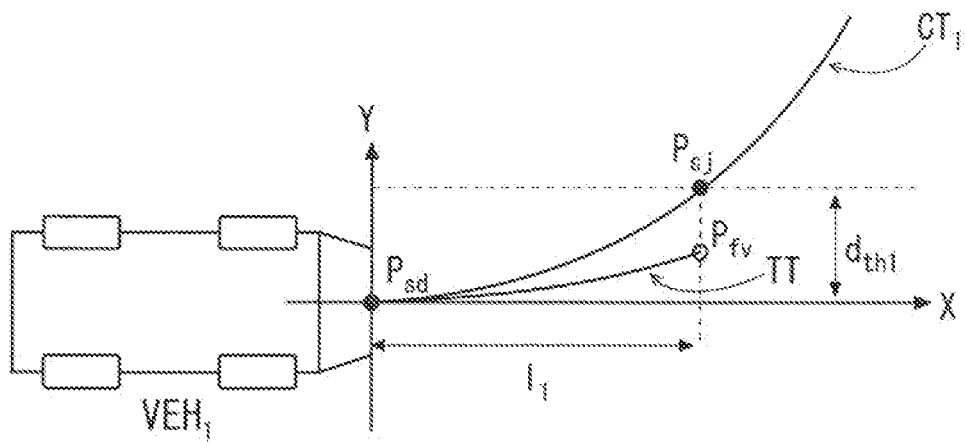
FIG. 6 is a diagram for describing a method of preceding vehicle straight travel determination.

With reference to FIG. 6, a method of the preceding vehicle straight travel determination performed by the preceding vehicle straight travel determination unit 6a will be described. Here, as in FIG. 6, a subject vehicle reference coordinate system in which the X-axis represents the traveling direction of the subject vehicle $VEH_1$ and the Y-axis represents the vehicle width direction is used, where $P_{sd}$ represents a reference position of the subject vehicle $VEH_1$, $P_{fv}$ represents a relative position of the preceding vehicle with respect to the reference position $P_{sd}$ of the subject vehicle $VEH_1$, $l_1$ represents a distance (inter vehicle distance) in the X-axis direction from the reference position $P_{sd}$ of the subject vehicle $VEH_1$ to the relative position $P_{fv}$ of the preceding vehicle, and TT represents the target track. Further, a threshold $d_{th1}$ for preceding vehicle straight travel determination is set at a position away from the X-axis in the Y-axis direction by a certain distance, and a position away from a position, which is away from the reference position $P_{sd}$ of the subject vehicle $VEH_1$ in the X-axis direction by the inter vehicle distance $l_1$, in the Y-axis direction by the threshold $d_{th1}$ is defined as a preceding vehicle straight travel determination position $P_{sj}$.

In this case, a track $CT_1$ connecting the reference position $P_{sd}$ of the subject vehicle and the preceding vehicle straight travel determination position $P_{sj}(X_{sj}(t), Y_{sj}(t))$ can be expressed as in the following expression (11).

[Expression 11]

$$Y(t)=(Y_{sj}(t)/X_{sj}(t)^2)X^2 \qquad (11)$$

Further, curvature $K_{CT1}(t)$ of the track $CT_1$ expressed by the expression (11) can be expressed as in the following expression (12).

[Expression 12]

$$K_{CT1}(t)=2(Y_{sj}(t)/X_{sj}(t)^2) \qquad (12)$$

The preceding vehicle straight travel determination unit 6a compares the magnitude of the curvature $K_{CT1}(t)$ expressed by the expression (12) and the magnitude of the curvature $K_{2r}(t)$ of the target track TT expressed by the expression (7) or the expression (10), and when the magnitude of the curvature $K_{2r}(t)$ is smaller than the magnitude of the curvature $K_{CT1}(t)$, the preceding vehicle straight travel determination unit 6a determines that the preceding vehicle is traveling straight. When the preceding vehicle straight travel determination unit 6a determines that the preceding vehicle is traveling straight, the target track correction determination unit 6 determines that correction of the target track generated in the target track generator 5 is necessary.

When the target track correction determination unit 6 determines that correction of the target track is necessary, the correction target track generator 7 corrects the target track, based on the subject vehicle reference preceding vehicle positions calculated by the subject vehicle reference preceding vehicle position calculator 4 or the target track generated by the target track generator 5. The target track after correction is hereinafter referred to as a "correction target track". Specifically, the correction target track generator 7 generates the correction target track by lowering the degree of the polynomial representing the target track, with respect to the target track generated by the target track generator 5 by performing polynomial approximation. In other words, the correction target track generated by the correction target track generator 7 is generated by performing, on the point group of the subject vehicle reference preceding vehicle positions, polynomial approximation of a degree lower than the degree of the polynomial approximation used by the target track generator 5 to generate the target track.

For example, when the target track generated by the target track generator 5 is a target track of cubic approximation as expressed in the expression (6), the correction target track generator 7 generates the target track of quadratic approximation as expressed in the expression (9) or the target track of linear approximation as expressed in the following expression (13) as the correction target track.

[Expression 13]

$$Y(t)=K_{01}(t)+K_{11}(t)X \qquad (13)$$

In the expression (13), $K_{01}(t)$ represents a term related to a lateral position with respect to the reference position of the subject vehicle, and $K_{11}(t)$ represents a term related to inclination of the target track.

Further, the correction target track generator 7 may set a term of a high degree included in the approximation of the target track generated by the target track generator 5 to 0 to generate the target track of a low degree, and may use the target track as the correction target track.

The controller 8 controls the operation of the subject vehicle, based on the target track generated by the target track generation apparatus 10 (the target track generated by the target track generator 5 or the correction target track generated by the correction target track generator 7). Specifically, the controller 8 controls a steering angle of the subject vehicle so as to cause the subject vehicle to follow the target track generated by the target track generation apparatus 10.

The target track generation apparatus 10 according to the first embodiment corrects the target track by lowering the degree of the polynomial representing the target track when the preceding vehicle is traveling straight. Detection errors of the relative position of the preceding vehicle are liable to influence the shape of the target track when the preceding vehicle is traveling straight; however, by lowering the degree of the target track, such influence can be reduced. For example, curvature variation of the target track caused by the detection errors can be reduced by correcting the target track obtained with cubic approximation into the target track obtained with quadratic approximation. Further, the vehicle control apparatus 100 can accurately and smoothly execute control of the subject vehicle by controlling the subject vehicle based on the target track generated by the target track generation apparatus 10.

The operation of the vehicle control apparatus 100 according to the first embodiment will be described below with reference to flowcharts.

Figure 7:
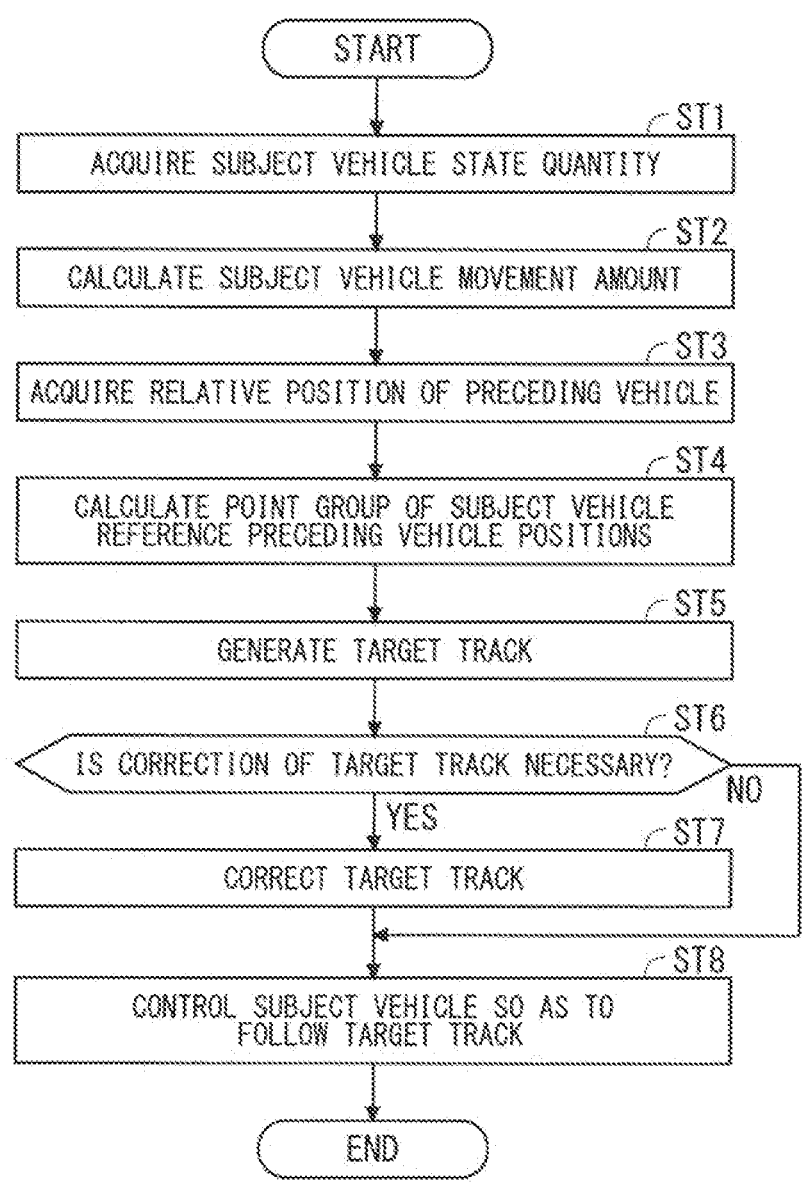
FIG. 7 is a flowchart illustrating operation of the vehicle control apparatus according to the first embodiment.

FIG. 7 is a flowchart illustrating an overall operation of the vehicle control apparatus 100. In Step ST1, the subject vehicle state quantity acquisition unit 2 acquires a state quantity of the subject vehicle, such as a velocity and a yaw rate. In Step ST2, the subject vehicle movement amount calculator 3 calculates the movement amount of the subject vehicle, based on the subject vehicle state quantity acquired in Step ST1. In Step ST3, the preceding vehicle position acquisition unit 1 acquires a relative position of the preceding vehicle with respect to the subject vehicle. A certain time period of a history of the relative positions of the preceding vehicle acquired in Step ST3 is stored in the preceding vehicle position acquisition unit 1.

In Step ST4, the subject vehicle reference preceding vehicle position calculator 4 calculates a history of preceding vehicle positions converted into the subject vehicle reference coordinate system (point group of the subject vehicle reference preceding vehicle positions), based on the subject vehicle movement amount calculated in Step ST2 and the history of the relative positions of the preceding vehicle acquired in Step ST3. In Step ST5, the target track generator 5 generates the target track by performing polynomial approximation on the point group of the subject vehicle reference preceding vehicle positions calculated in Step ST4. In Step ST6, the target track correction determination unit 6 determines whether or not correction of the target track generated in Step ST5 is necessary. A detailed flow of Step ST6 will be described later.

When it is determined that correction of the target track is necessary in Step ST6, in Step ST7, the correction target track generator 7 corrects the target track generated in Step ST5. A correction method of the target track is performed as follows: the correction target track is generated by performing polynomial approximation on the target track generated in Step ST5 again with a degree lower than the target track. Further, a term of a high degree of the target track having a higher degree may be set to 0 to calculate the target track of a low degree, and the target track may be used as the correction target track.

In Step ST8, the controller 8 controls the subject vehicle so that the target track generation apparatus 10 follows the generated target track. Specifically, when it is determined that correction of the target track is not necessary, the controller 8 controls operation of the subject vehicle, based on the target track generated in Step ST5. Further, when it is determined that correction of the target track is necessary, the controller 8 controls operation of the subject vehicle, based on the target track corrected in Step ST7 (correction target track). The vehicle control apparatus 100 repeatedly executes the processing of FIG. 7.

Figure 8:
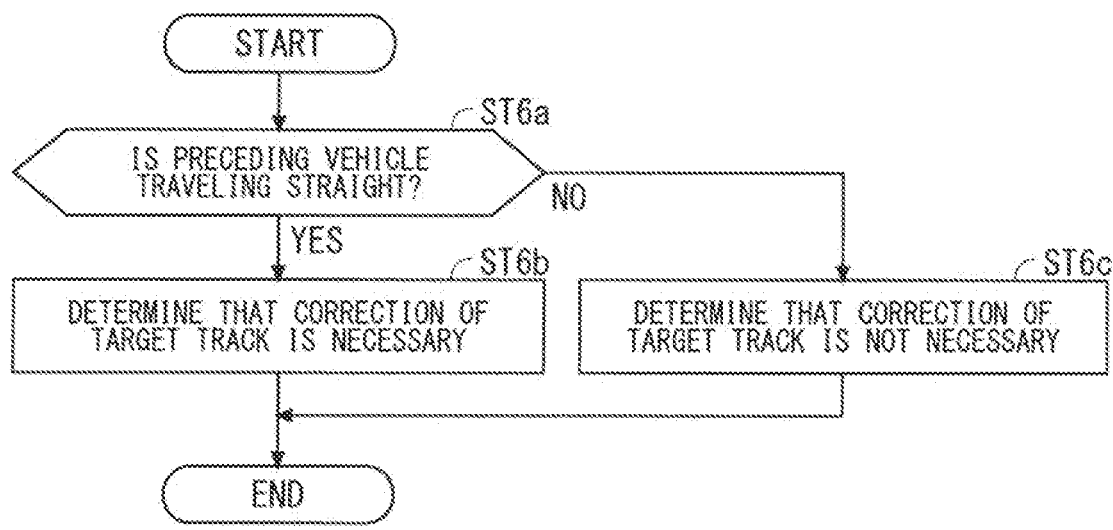
FIG. 8 is a flowchart of the target track correction determination according to the first embodiment.

The details of the determination processing (target track correction determination) of Step ST6 of FIG. 7 are illustrated in the flowchart of FIG. 8. In Step ST6a, the preceding vehicle straight travel determination unit 6a determines whether or not the preceding vehicle is traveling straight. When it is determined that the preceding vehicle is traveling straight, the processing proceeds to Step ST6b, and the target track correction determination unit 6 determines that correction of the target track is necessary. On the other hand, when it is determined that the preceding vehicle is traveling straight, the processing proceeds to Step ST6c, and the target track correction determination unit 6 determines that correction of the target track is not necessary.

Figure 9:
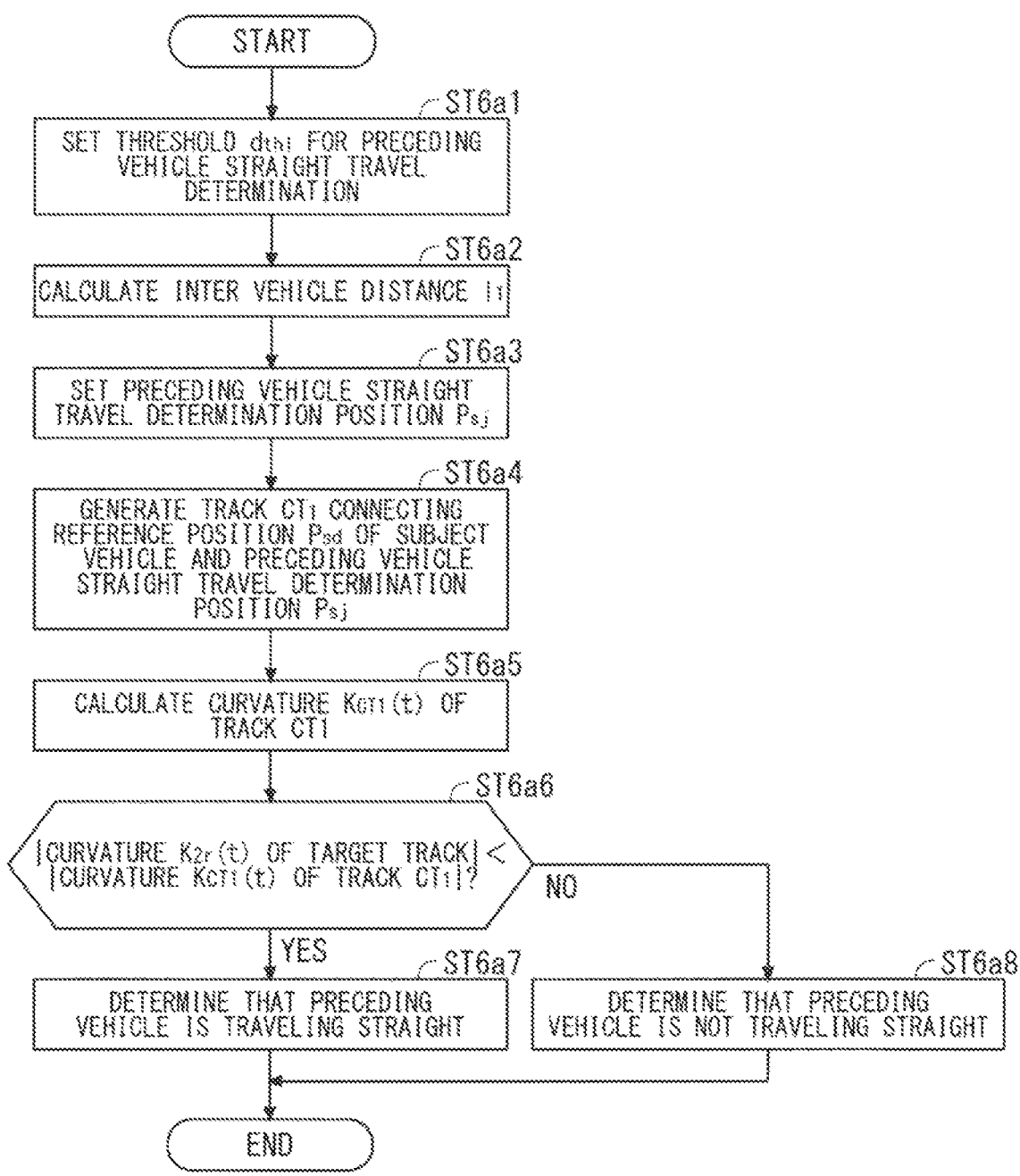
FIG. 9 is a flowchart for the preceding vehicle straight travel determination according to the first embodiment.

The details of the determination processing (preceding vehicle straight travel determination) of Step ST6a of FIG. 8 are illustrated in the flowchart of FIG. 9 (see also the explanatory diagram of FIG. 6). In Step ST6a1, the preceding vehicle straight travel determination unit 6a sets the threshold $d_{th1}$ for preceding vehicle straight travel determination at a position away from the reference position $P_{sd}$ $(X_{sd}, Y_{sd})$ in the vehicle width direction (Y-axis direction) by a certain distance. In Step ST6a2, the preceding vehicle straight travel determination unit 6a calculates the inter vehicle distance $l_1$ between the subject vehicle and the preceding vehicle.

In Step ST6a3, the preceding vehicle straight travel determination unit 6a sets the preceding vehicle straight travel determination position $P_{sj}(X_{sj}, Y_{sj})=(l_1, d_{th1})$ at a position away from a position, which is away from the reference position $P_{sd}(X_{sd}, Y_{sd})$ in the traveling direction (X-axis direction) by the inter vehicle distance $l_1$, in the vehicle width direction by the threshold $d_{th1}$. In Step ST6a4, the preceding vehicle straight travel determination unit 6a generates the track $CT_1$ connecting the reference position $P_{sd}(X_{sd}, Y_{sd})$ of the subject vehicle and the preceding vehicle straight travel determination position $P_{sj}$. In Step ST6a5, the preceding vehicle straight travel determination unit 6a calculates the curvature $K_{CT1}(t)$ of the track $CT_1$.

In Step ST6a6, the preceding vehicle straight travel determination unit 6a determines whether or not the magnitude of the curvature $K_{2r}(t)$ of the target track is smaller than the magnitude of the curvature $K_{CT1}(t)$ of the track $CT_1$. When the magnitude of the curvature $K_{2r}(t)$ of the target track is smaller than the magnitude of the curvature $K_{CT1}(t)$ of the track $CT_1$, the processing proceeds to Step ST6a7, and the preceding vehicle straight travel determination unit 6a determines that the preceding vehicle is traveling straight. When the magnitude of the curvature $K_{2r}(t)$ of the target track is equal to or larger than the magnitude of the curvature $K_{CT1}(t)$ of the track $CT_1$, the processing proceeds to Step ST6a8, and the preceding vehicle straight travel determination unit 6a determines that the preceding vehicle is not traveling straight.

Second Embodiment

In the first embodiment, the target track correction determination unit 6 determines the necessity of correction of the target track, based on whether or not the preceding vehicle is traveling straight. In the second embodiment, the target track correction determination unit 6 performs the determination, based on the inter vehicle distance between the subject vehicle and the preceding vehicle.

Figure 10:
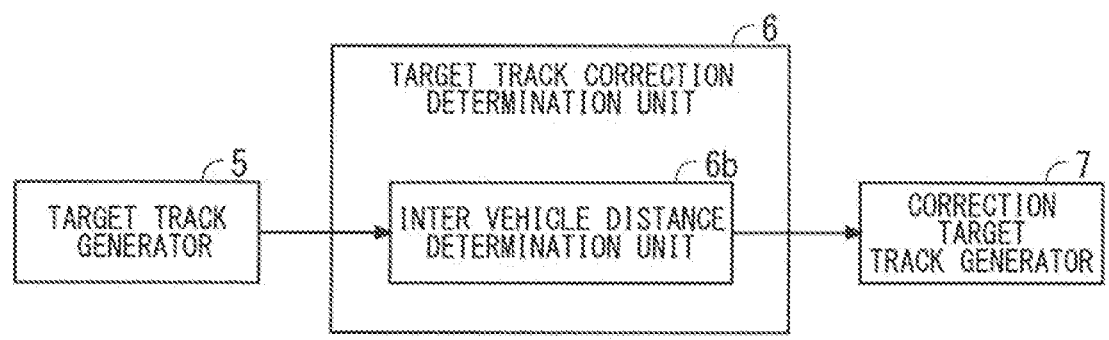
FIG. 10 is a block diagram illustrating a configuration of the target track correction determination unit of the vehicle control apparatus according to the second embodiment.

FIG. 10 is a block diagram illustrating a configuration of the target track correction determination unit 6 according to the second embodiment. The target track correction determination unit 6 according to the second embodiment includes an inter vehicle distance determination unit 6b that performs determination (hereinafter referred to as "inter vehicle distance determination") as to whether or not the inter vehicle distance between the subject vehicle and the preceding vehicle is equal to or less than a predetermined threshold.

Note that the overall configuration of the vehicle control apparatus 100 according to the second embodiment is similar to that of the first embodiment (FIG. 1), and description thereof is omitted herein.

Figure 11:
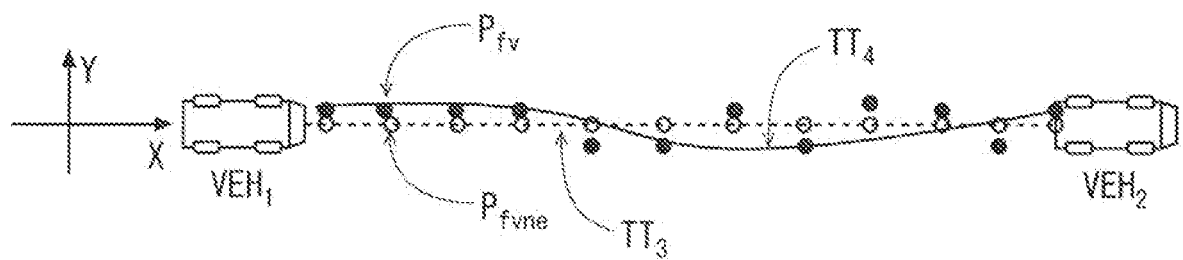
FIG. 11 is a diagram illustrating an example of a history of positions of a preceding vehicle followed by the subject vehicle and a target track.
Figure 12:
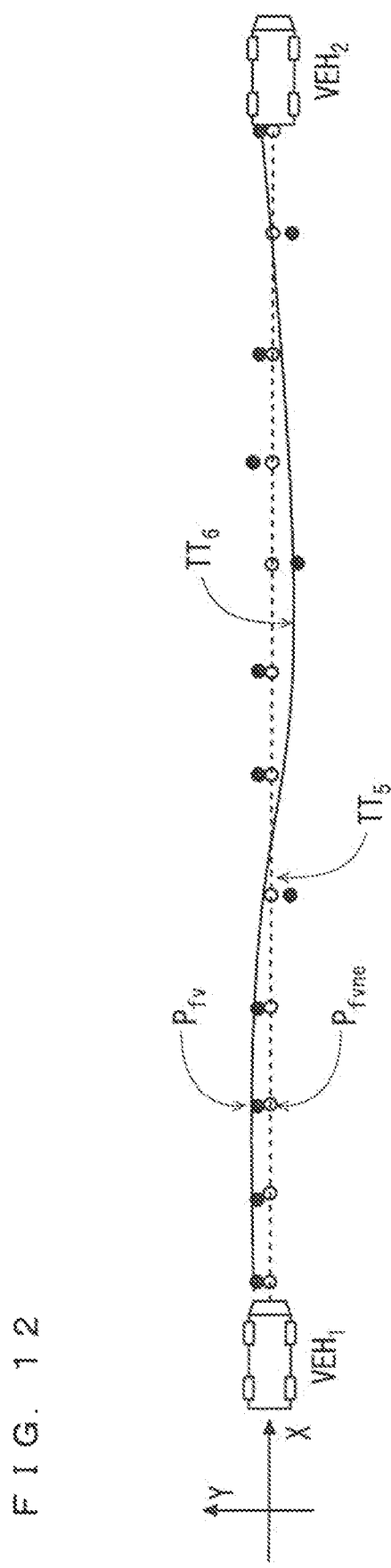
FIG. 12 is a diagram illustrating an example of a history of positions of a preceding vehicle followed by the subject vehicle and a target track.

The inter vehicle distance determination performed by the inter vehicle distance determination unit 6b will be described. FIG. 11 and FIG. 12 illustrate examples of a history of positions (point group of the subject vehicle reference preceding vehicle positions) of a preceding vehicle $VEH_2$ followed by a subject vehicle $VEH_1$ and target tracks. FIG. 11 and FIG. 12 illustrate, as the point group of the subject vehicle reference preceding vehicle positions of the preceding vehicle $VEH_2$, a point group $P_{fvne}$ not including detection errors and a point group $P_{fv}$ including detection errors.

FIG. 11 is an example of a case in which the inter vehicle distance between the subject vehicle $VEH_1$ and the preceding vehicle $VEH_2$ is short, and illustrates a target track $TT_3$, which is obtained by performing polynomial approximation on the point group $P_{fvne}$ not including detection errors, and a target track $TT_4$, which is obtained by performing polynomial approximation on the point group $P_{fv}$ including detection errors. FIG. 12 is an example of a case in which the inter vehicle distance between the subject vehicle $VEH_1$ and the preceding vehicle $VEH_2$ is long, and illustrates a target track $TT_5$, which is obtained by performing polynomial approximation on the point group $P_{fvne}$ not including detection errors, and a target track $TT_6$, which is obtained by performing polynomial approximation on the point group $P_{fv}$ including detection errors.

As in FIG. 11 and FIG. 12, in both of the case in which the inter vehicle distance is short and the case in which the inter vehicle distance is long, a difference is generated between the target track including errors ($TT_4$ or $TT_6$) and the target track not including errors ($TT_3$ or $TT_5$). Note that, in the case in which the inter vehicle distance is short (FIG. 11), the period of fluctuation of the target track including errors $TT_4$ in the vehicle width direction is short, and thus when the subject vehicle $VEH_1$ is caused to travel by following the target track $TT_4$, the number of times of steering per certain time period (or per certain distance) is relatively large. On the other hand, in the case in which the inter vehicle distance is long (FIG. 12), the period of fluctuation of the target track including errors $TT_6$ in the vehicle width direction is long, and thus even when the subject vehicle $VEH_1$ is caused to travel by following the target track $TT_6$, the number of times of steering per certain time period may be relatively small. Hence, it can be said that the need for perthrming correction of the target track is low when the inter vehicle distance is long, whereas the need is high when the inter vehicle distance is short.

Thus, when the inter vehicle distance determination unit 6b determines that the inter vehicle distance between the subject vehicle and the preceding vehicle is equal to or less than a threshold, the target track correction determination unit 6 according to the second embodiment determines that correction of the target track is necessary.

Figure 13:
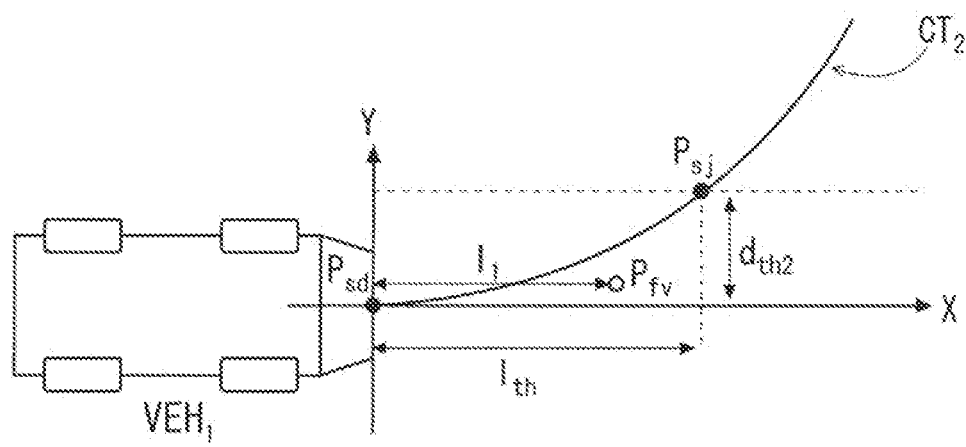
FIG. 13 is a diagram for describing a method of inter vehicle distance determination.

With reference to FIG. 13, a method of the preceding vehicle straight travel determination performed by the inter vehicle distance determination unit 6b will be described. Here, as in FIG. 13, a subject vehicle reference coordinate system in which the X-axis represents the traveling direction of the subject vehicle $VEH_1$ and the Y-axis represents the vehicle width direction is used, where $P_{sd}$ represents a reference position of the subject vehicle $VEH_1$, $P_{fv}$ represents a relative position of the preceding vehicle with respect to the reference position $P_{sd}$ of the subject vehicle $VEH_1$, and $l_1$ represents a distance (inter vehicle distance) in the X-axis direction from the reference position $P_{sd}$ of the subject vehicle $VEH_1$ to the relative position $P_{fv}$ of the preceding vehicle. Further, a first threshold $d_{th2}$ for inter vehicle distance determination is set at a position away from the X-axis in the Y-axis direction by a certain distance.

Let V(t) be velocity of the subject vehicle and $\alpha_{ylim}$ be a limit value of lateral acceleration. In this case, a track $CT_2$ of a case assuming a regular circular driving with the lateral acceleration at the limit value $\alpha_{ylim}$ can be expressed as in the following expression (14).

[Expression 14]

$$Y(t)=(\alpha_{ylim}/2V(t)^2)X^2 \qquad (14)$$

In the second embodiment, an X coordinate when a Y coordinate of the track $CT_2$ expressed by the expression (14) is the same as that of the first threshold $d_{th2}$ is set as a second threshold $l_{th}$ for inter vehicle distance determination. The second threshold $l_{th}$ can be expressed as in the following expression (15).

[Expression 15]

$$l_{th}(t)=V(t)\sqrt{(2d_{th2}/\alpha_{ylim})} \qquad (15)$$

The inter vehicle distance determination unit 6b compares the inter vehicle distance $l_1$ between the subject vehicle and the preceding vehicle and the second threshold $l_{th}$ expressed by the expression (15), and when the inter vehicle distance $l_1$ is equal to or less than the second threshold $l_{th}$, the inter vehicle distance determination unit 6b determines that the inter vehicle distance is short.

By setting the threshold (second threshold $l_{th}$) used as a reference for determining whether or not the inter vehicle distance is short in the manner described above, the inter vehicle distance determination according to the velocity of the subject vehicle can be performed. Note that a determination method of the threshold may not be the method that is based on the limit value $\alpha_{ylim}$ of the lateral acceleration. For example, a table in which a relationship between the vehicle velocity of the subject vehicle and the threshold for inter vehicle distance determination is described may be provided in advance.

When the inter vehicle distance determination unit 6b determines that the inter vehicle distance between the subject vehicle and the preceding vehicle is short, the target trade correction determination unit 6 according to the second embodiment determines that correction of the target track generated in the target track generator 5 is necessary. Note that a correction method of the target track by the correction target track generator 7 may be, similarly to the first embodiment, the method of lowering the degree of the polynomial representing the target track.

When the inter vehicle distance between the subject vehicle and the preceding vehicle is short, the target track generation apparatus 10 according to the second embodiment corrects the target track by lowering the degree of the polynomial representing the target track. When the inter vehicle distance is short, the period of fluctuation of the target track caused by the detection errors of the relative position of the preceding vehicle is short; however, by lowering the degree of the target track, the fluctuation of the target track is reduced, and the number of times of steering per certain time period is prevented from increasing. Further, the vehicle control apparatus 100 can accurately and smoothly execute control of the subject vehicle by controlling the subject vehicle based on the target track generated in the target track generation apparatus 10.

With reference to a flowchart, the operation of the vehicle control apparatus 100 according to the second embodiment will be described below. Note that the overall operation of the vehicle control apparatus 100 is similar to that of the flowchart of FIG. 7 described in the first embodiment, and only the determination processing (target track correction determination) of Step ST6 of FIG. 7 will be described herein.

Figure 14:
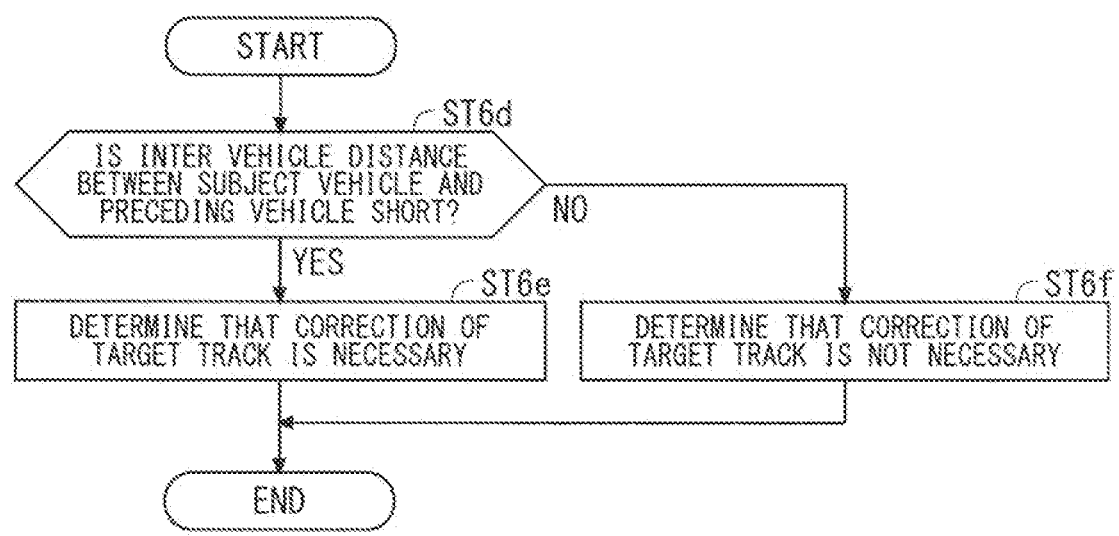
FIG. 14 is a flowchart of the target track correction determination according to the second embodiment.

The processing of the target track correction determination according to the second embodiment is illustrated in the flowchart of FIG. 14. In Step ST6d, the inter vehicle distance determination unit 6b determines whether or not the inter vehicle distance between the subject vehicle and the preceding vehicle is equal to or less than a predetermined threshold for inter vehicle distance determination (for example, the second threshold $d_{th2}$). When the inter vehicle distance between the subject vehicle and the preceding vehicle is equal to or less than the threshold, the processing proceeds to Step ST6e, and the target track correction determination unit 6 determines that correction of the target track is necessary. On the other hand, when the inter vehicle distance between the subject vehicle and the preceding vehicle is larger than the threshold, the processing proceeds to Step ST6f, and the target track correction determination unit 6 determines that correction of the target track is not necessary.

Figure 15:
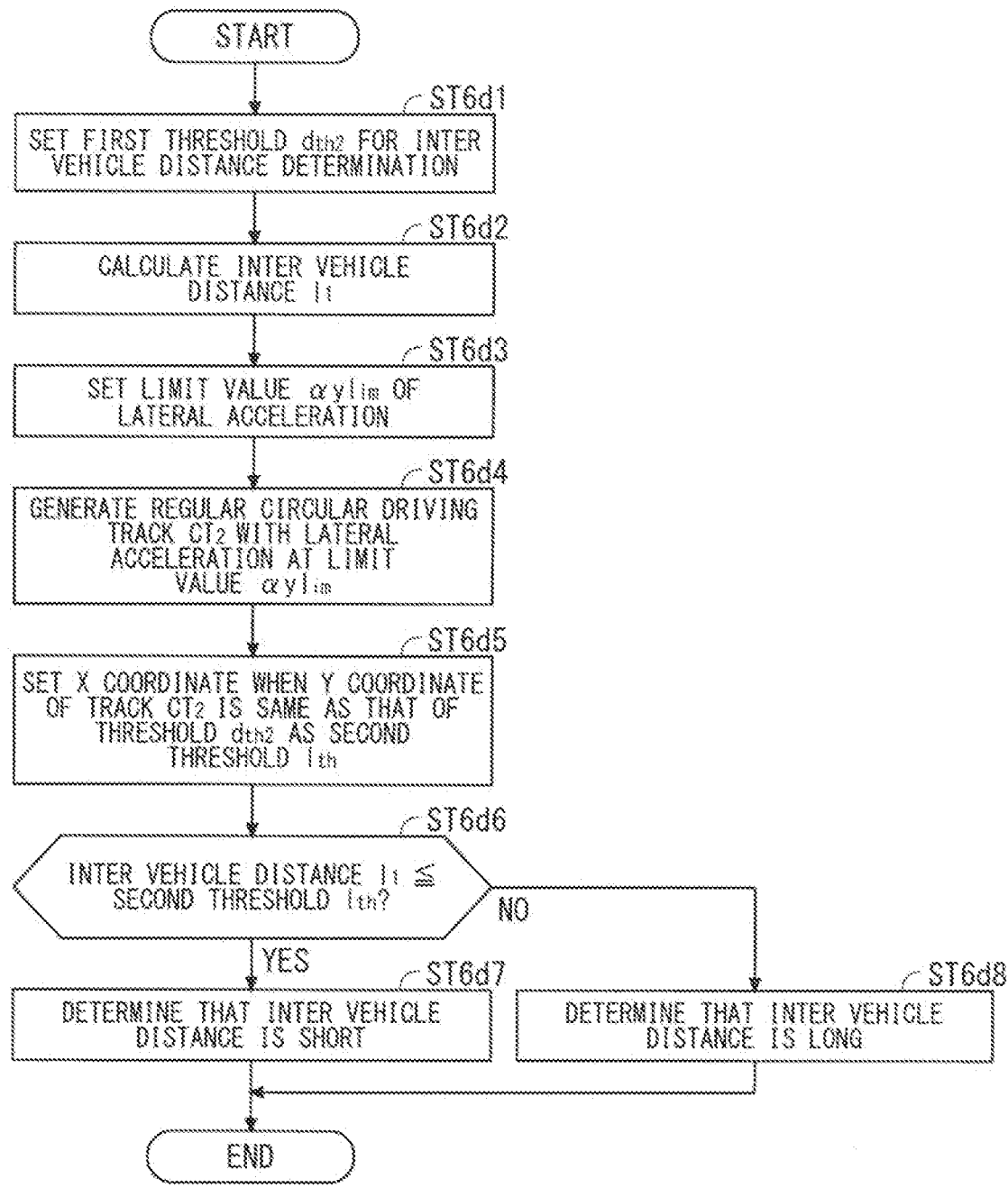
FIG. 15 is a flowchart of the inter vehicle distance determination according to the second embodiment.

The details of the determination processing (inter vehicle distance determination) of Step ST6d of FIG. 14 are illustrated in the flowchart of FIG. 15 (see also the explanatory diagram of FIG. 13). Here, the X-axis of the subject vehicle reference coordinate system represents the traveling direction of the subject vehicle, and the Y-axis represents the vehicle width direction of the subject vehicle.

In Step ST6d1, the inter vehicle distance determination unit 6b sets the first threshold $d_{th2}$ for inter vehicle distance determination at a position away from the X-axis of the subject vehicle reference coordinate system in the Y-axis direction by a certain distance. In Step ST6d2, the inter vehicle distance determination unit 6b calculates the inter vehicle distance $l_1$ between the subject vehicle and the preceding vehicle. In Step ST6d3, the inter vehicle distance determination unit 6b sets the limit value $\alpha_{ylim}$ of lateral acceleration of the subject vehicle. In Step ST6d4, the inter vehicle distance determination unit 6b generates the track $CT_2$ assuming regular circular driving with the lateral acceleration of the subject vehicle at the limit value $\alpha_{ylim}$. In Step ST6d5, the inter vehicle distance determination unit 6b calculates an X coordinate when a Y coordinate of the track $CT_2$ is the same as that of the first threshold $d_{th2}$, and sets the value as the second threshold $l_{th}$ for inter vehicle distance determination.

In Step ST6d6, the inter vehicle distance determination unit 6b determines whether or not the inter vehicle distance $l_1$ is equal to or less than the second threshold $l_{th}$. When the inter vehicle distance $l_1$ is equal to or less than the second threshold $l_{th}$, the processing proceeds to Step ST6d7, and the inter vehicle distance determination unit 6b determines that the inter vehicle distance $l_1$ is short. When the inter vehicle distance $l_1$ is larger than the second threshold $l_{th}$, the processing proceeds to Step ST6d8, and the inter vehicle distance determination unit 6b determines that the inter vehicle distance $l_1$ is long.

Third Embodiment

In the third embodiment, the target track generator 5 generates two target tracks having different degrees of polynomial approximations, and the target track correction determination unit 6 determines necessity of correction of the target track, based on the difference between the two target tracks.

Figure 16:
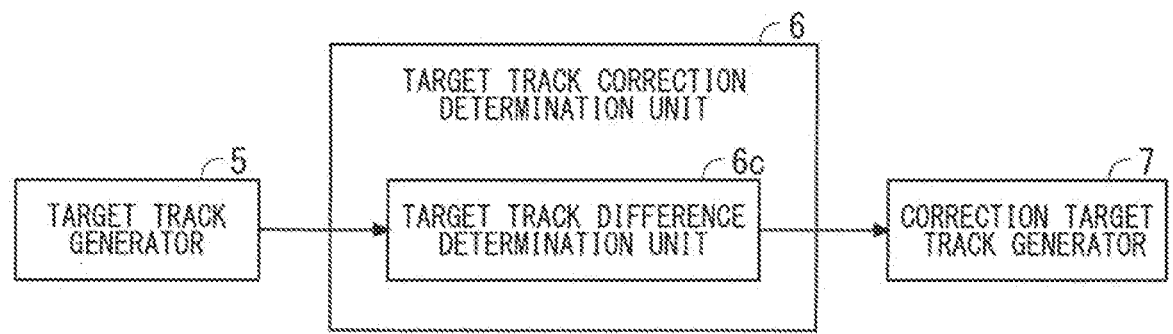
FIG. 16 is a block diagram illustrating a configuration of the target track correction determination unit of the vehicle control apparatus according to the third embodiment.

FIG. 16 is a block diagram illustrating a configuration of the target track correction determination unit 6 according to the third embodiment. The target track correction determination unit 6 according to the third embodiment includes a target track difference determination unit 6c that performs determination (hereinafter referred to as "target track difference determination" as to whether or not the difference between two target tracks having different degrees of polynomial approximations is equal to or less than a predetermined threshold.

Figure 17:
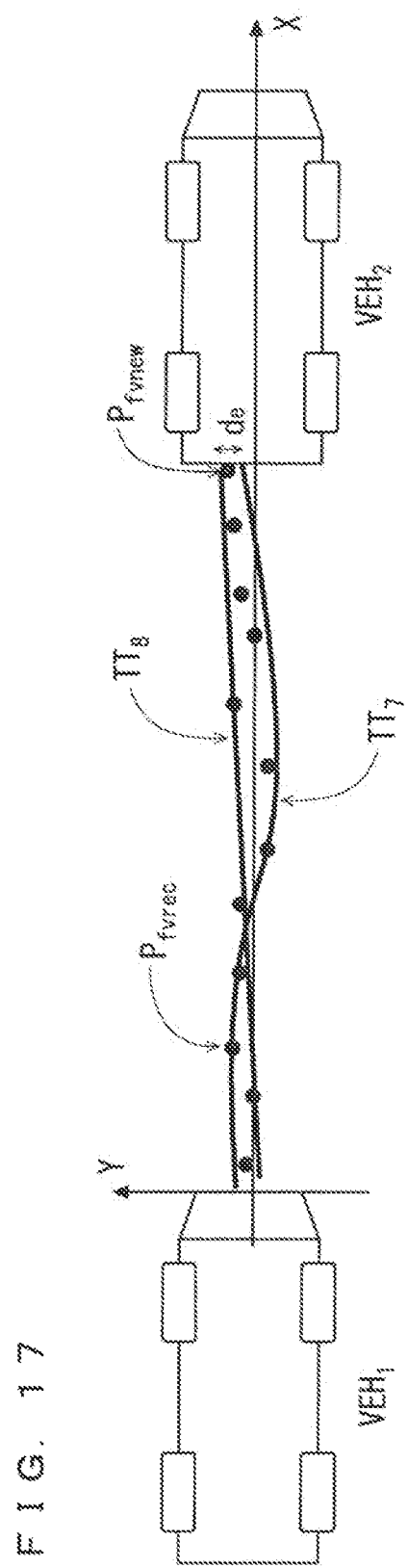
FIG. 17 is a diagram for describing a method of target track difference determination.

The target track difference determination performed by the target track difference determination unit 6c will be described. FIG. 17 illustrates an example of a history of positions (point group of the subject vehicle reference preceding vehicle positions) of a preceding vehicle $VEH_2$ followed by a subject vehicle $VEH_1$ and target tracks.

As illustrated in FIG. 17, a subject vehicle reference coordinate system in which the X-axis represents the traveling direction of the subject vehicle $VEH_1$ and the Y-axis represents the vehicle width direction is used, where $P_{fvrec}$ represents a history of positions of the preceding vehicle (point group of the subject vehicle reference preceding vehicle positions). The target track generator 5 generates two target tracks by performing two types of polynomial approximations having different degrees on the point group $P_{fvrec}$. In the example of FIG. 17, the target track generator 5 generates a target track $TT_7$, which is obtained by performing cubic approximation on the point group $P_{fvrec}$ by using the expression (6), and a target track $TT_8$, which is obtained by performing linear approximation on the point group $P_{fvrec}$ by using the expression (13). Further, $P_{fvnew}$ ($X_{fvnew}$, $Y_{fvnew}$) represents a point that indicates the most recently detected position of the preceding vehicle in the point group $P_{fvrec}$ of the subject vehicle reference preceding vehicle positions.

The target track difference determination unit 6c calculates a Y coordinate $Y_h$ when an X coordinate is the same as the X coordinate ($X_{fvnew}$) of the point $P_{fvnew}$ in the target track $TT_7$ and a Y coordinate $Y_l$ when an X coordinate is the same as the X coordinate ($X_{fvnew}$) of the point $P_{fvnew}$ in the target track $TT_8$, and further calculates the magnitude of the difference between $Y_h$ and $Y_l$ as a target track difference $d_e$.

Then, the target track difference determination unit 6c compares the target track difference $d_e$ and a predetermined threshold $d_{th3}$ for target track difference determination. When the target track difference $d_e$ is equal to or less than the threshold $d_{th3}$, the target track difference determination unit 6c determines that the difference between the two target tracks $TT_7$ and $TT_8$ is small. When the target track difference $d_e$ is larger than the threshold $d_{th3}$, the target track difference determination unit 6c determines that the difference between the two target tracks $TT_7$ and $TT_a$ is large.

Here, the target track obtained with polynomial approximation of a high degree has high accuracy of approximation but has a shape with many curvature variations. Accordingly, the target track has a large number of times of steering when the subject vehicle is caused to travel by thllowing another vehicle. On the other hand, the target track obtained with polynomial approximation of a low degree does not have high accuracy of approximation but has a stable shape with fewer curvature variations. Accordingly, the target track can reduce the number of times of steering when the subject vehicle is caused to travel by following another vehicle and contribute to smooth control of the subject vehicle. Thus, when the shape of the target track obtained with polynomial approximation of a high degree and the shape of the target track obtained with polynomial approximation of a low degree are similar to each other, it is preferable that the target track obtained with polynomial approximation of a low degree be used.

Thus, when the difference between two target tracks having different degrees is small, the target track correction determination unit 6 according to the third embodiment determines that it is necessary to correct the target track of a high degree into the target track of a low degree in order to implement smooth control of the subject vehicle. Further, when the difference between two target tracks is large, the target track correction determination unit 6 determines that correction of the target track of a high degree is not necessary in order to maintain accuracy of the approximation.

When it is determined that correction of the target track is necessary, the correction target track generator 7 uses, out of the two target tracks, the target track with polynomial approximation of a lower degree as the correction target track, whereas when it is determined that correction of the target track is not necessary, the correction target track generator 7 uses the target track with polynomial approximation of a higher degree as the correction target track.

When the difference between two target tracks having different degrees is small, the target track generation apparatus 10 according to the third embodiment can reduce curvature variation of the target track caused by the detection errors by correcting the target track by adopting the target track of a lower degree. Further, the vehicle control apparatus 100 can accurately and smoothly execute control of the subject vehicle by controlling the subject vehicle based on the target track generated by the target track generation apparatus 10.

With reference to a flowchart, the operation of the vehicle control apparatus 100 according to the third embodiment will be described below. The overall operation of the vehicle control apparatus 100 is largely similar to that of the flowchart of FIG. 7 described in the first embodiment. However, details of the generation processing of the target track in Step ST5, the processing of the target track correction determination in Step ST6, and the generation processing of the correction target track in Step ST7 are different from those of the first embodiment. Thus, processing of Steps ST5, ST6, and ST7 of FIG. 7 will be described herein.

In the third embodiment, in Step ST5 of FIG. 7, the target track generator 5 generates two target tracks having different degrees of polynomial approximations. The target track having a higher degree of the two target tracks is defined as a regular target track. The target track having a lower degree is used for the target track correction determination in Step ST6, for example, and is also used as the correction target track when it is determined that correction of the target track is necessary.

Note that the target track generator 5 may generate three or more target tracks having different degrees, and the target track correction determination unit 6 may select two of the target tracks. Further, the target track generator 5 may generate the target track having a lower degree by setting a term of a high degree of the target track having a higher degree to 0.

The determination processing of Step ST6 in the third embodiment is illustrated in the flowchart of FIG. 18. In Step ST6g, the target track difference determination unit 6c determines whether or not the difference between two target tracks having different degrees is small. When the difference between the target tracks is small, the processing proceeds to Step ST6h, and the target track difference determination unit 6c determines that correction of the target track is necessary. When the difference between the target tracks is large, the processing proceeds to Step ST6i, and the target track difference determination unit 6c determines that correction of the target track is not necessary.

Figure 19:
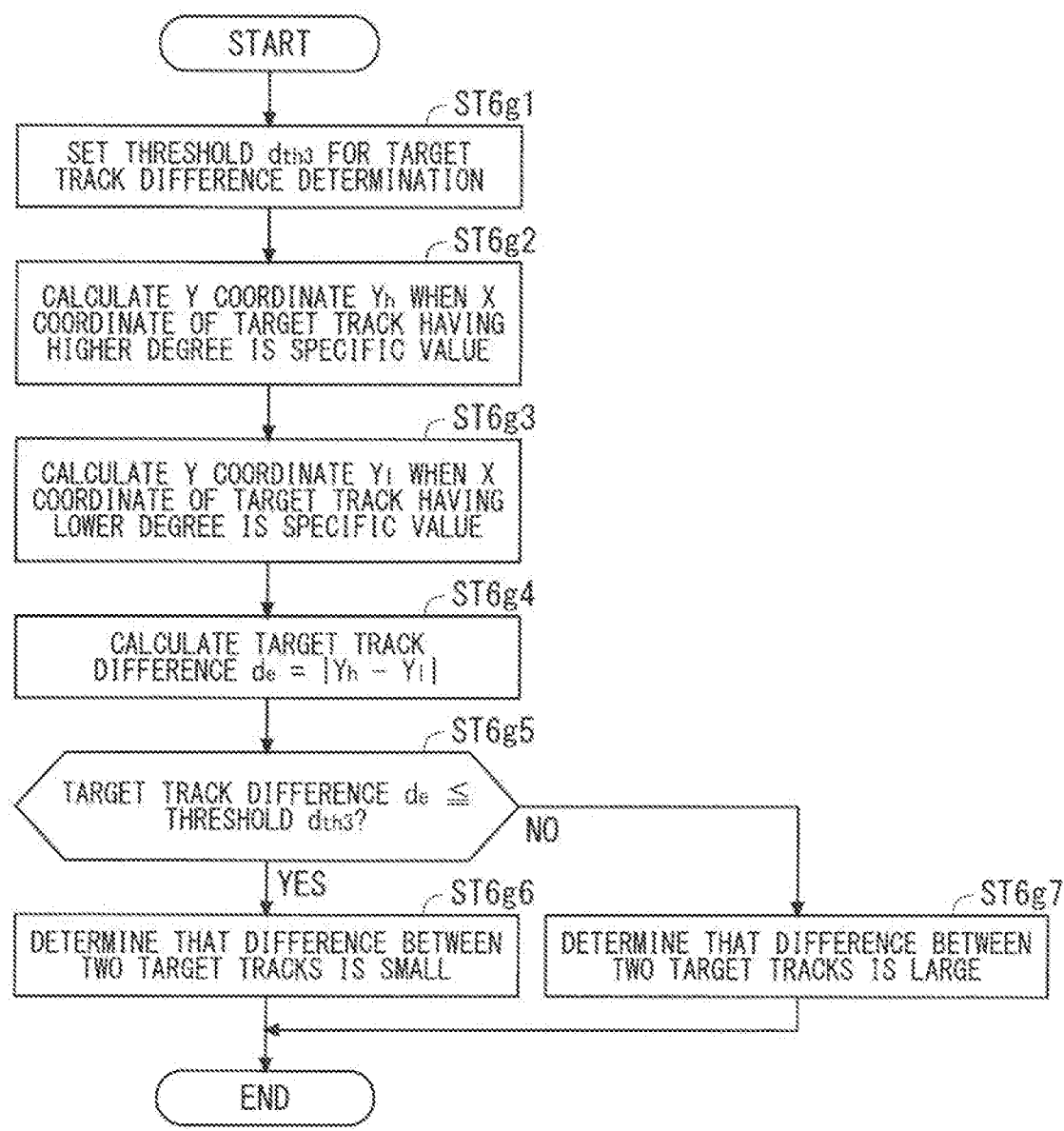
FIG. 19 is a flowchart of the target track difference determination according to the third embodiment.

The details of the determination processing (target track difference determination) of Step ST6g of FIG. 18 are illustrated in the flowchart of FIG. 19 (see also the explanatory diagram of FIG. 17). Here, the X-axis of the subject vehicle reference coordinate system represents the traveling direction of the subject vehicle, and the Y-axis represents the vehicle width direction of the subject vehicle.

In Step ST6g1, the target track difference determination unit 6c sets a threshold $d_{th3}$ for target track difference determination. In Step ST6g2, the target track difference determination unit 6e calculates a Y coordinate $Y_h$ when an X coordinate is the same as a specific value (for example, $X_{fvnew}$ of FIG. 17) in the target track having a higher degree. In Step ST6g3, the target track difference determination unit 6c calculates a Y coordinate $Y_l$ when an X coordinate is the same as the specific value in the target track having a lower degree. In Step ST6g4, the target track difference determination uiiit 6c calculates the following expression: Target track difference $d_e = |Y_h - Y_l|$.

In Step ST6g5, the target track difference determination unit 6c determines whether or not the target track difference $d_e$ is equal to or less than the threshold $d_{th3}$. When the target track difference $d_e$, is equal to or less than the threshold $d_{th3}$, the processing proceeds to Step ST6g6, and the target track difference determination unit 6c determines that the difference between the two target tracks is small. When the target track difference $d_e$ is larger than the threshold $d_{th3}$, the processing proceeds to Step ST6g7, and it is determined that the difference between the two target tracks is large.

Further, in the third embodiment, in Step ST7 of FIG. 7, when it is determined in Step ST6 that correction of the target track is necessary, the target track having a lower degree of the two target tracks generated in Step ST5 is used as the correction target track.

<Hardware Configuration Example>

Figure 20:
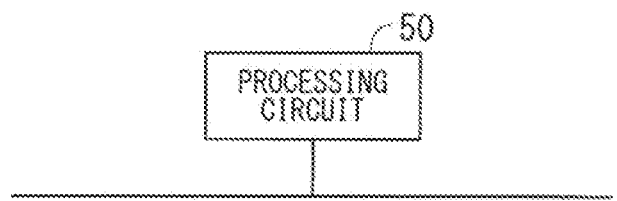
FIG. 20 is a diagram illustrating a hardware configuration example of a target track generation apparatus.
Figure 21:
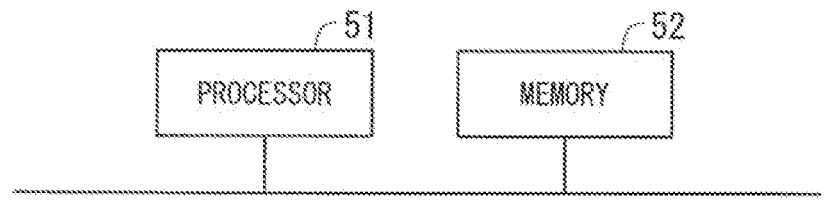
FIG. 21 is a diagram illustrating a hardware configuration example of the target track generation apparatus.

FIG. 20 and FIG. 21 are each a diagram illustrating an example of a hardware configuration of the target track generation apparatus 10. Each function of the components of the target track generation apparatus 10 illustrated in FIG. 1 is implemented by a processing circuit 50 illustrated in FIG. 20, for example. Specifically, the target track generation apparatus 10 includes the processing circuit 50 for performing processes of: acquiring the relative position of the preceding vehicle traveling in front of the subject vehicle; acquiring the state quantity of the subject vehicle; calculating the movement amount of the subject vehicle, based on the state quantity of the subject vehicle; calculating the point group of the subject vehicle reference preceding vehicle positions representing a history of the relative position of the preceding vehicle in a coordinate system using the current position of the subject vehicle as a reference, based on the relative position of the preceding vehicle and the movement amount of the subject vehicle; generating the target track of the subject vehicle, based on the point group of the subject vehicle reference preceding vehicle positions; determining whether or not correction of the target track is necessary, based on the point group of the subject vehicle reference preceding vehicle positions or the target track; and generating the correction target track obtained by correcting the target track, based on the point group of the subject vehicle reference preceding vehicle positions or the target track, when it is determined that correction of the target track is necessary. The processing circuit 50 may be dedicated hardware, or may be configured by using a processor (also referred to as a central processing unit (CPU), a processing apparatus, an arithmetic apparatus, a microprocessor, a microcomputer, or a digital signal processor (DSP)) that executes a program stored in a memory.

When the processing circuit 50 is dedicated hardware, examples of the processing circuit 50 include a single circuit, a composite circuit, a programmed processor, a parallel programmed processor, an application specific integrated circuit (ASIC), a field-programmable gate array (FPGA), or a combination of these, for example. Each of the functions of the components of the target track generation apparatus 10 may be implemented with individual processing circuits, or those functions may be collectively implemented with one processing circuit.

FIG. 21 illustrates an example of a hardware configuration of the target track generation apparatus 10 of a case where the processing circuit 50 is configured using a processor 51 that executes a program. In this case, the functions of the components of the target track generation apparatus 10 are implemented with software or the like (software, firmware, or a combination of software and firmware). The software or the like is described as a program and is stored in a memory 52. The processor 51 implements the function of each unit by reading and executing the program stored in the memory 52. Specifically, the target track generation apparatus 10 includes the memory 52 for storing the program, When being executed by the processor 51, the program is to execute: processing of acquiring the relative position of the preceding vehicle traveling in front of the subject vehicle; processing of acquiring the state quantity of the subject vehicle; processing of calculating the movement amount of the subject vehicle, based on the state quantity of the subject vehicle; processing of calculating the point group of the subject vehicle reference preceding vehicle positions representing a history of the relative position of the preceding vehicle in a coordinate system using the current position of the subject vehicle as a reference, based on the relative position of the preceding vehicle and the movement amount of the subject vehicle; processing of generating the target track of the subject vehicle, based on the point group of the subject vehicle reference preceding vehicle positions; processing of determining whether or not correction of the target track is necessary, based on the point group of the subject vehicle reference preceding vehicle positions or the target track; and processing of generating the correction target track obtained by correcting the target track, based on the point group of the subject vehicle reference preceding vehicle positions or the target track, when it is determined that correction of the target track is necessary. In other words, it can also be said that the program causes a computer to execute a procedure and a method of operations of the components of the target track generation apparatus 10.

Here, the memory 52 may be, for example, non-volatile or volatile semiconductor memory, such as a random access memory (RAM), a read only memory (ROM), a flash memory, an erasable programmable read only memory (EPROM), and an electrically erasable programmable read only memory (EEPROM), a hard disk drive (HDD), a magnetic disk, a flexible disk, an optical disc, a compact disc, a MiniDisc, a digital versatile disc (DVD), and a drive apparatus or the like therefor, or any storage medium to be used in future.

The above has described a configuration in which the functions of the components of the target track generation apparatus 10 are implemented with any One of hardware and software or the like. However, this is not restrictive, and a part of the components of the target track generation apparatus 10 may be implemented with dedicated hardware, and another part of the components may be implemented with software or the like. For example, functions of a part of the components can be implemented with the processing circuit 50 as the dedicated hardware, and functions of another part of the components can be implemented with the processing circuit 50 as the processor 51 reading and executing a program stored in the memory 52.

As described above, the target track generation apparatus 10 can implement each function described above with hardware, software or the like, or a combination of these.

Note that, in the present invention, each embodiment can be freely combined and each embodiment can be modified or omitted as appropriate within the scope of the invention.

While the present invention has been shown and described in detail, the foregoing description is in all aspects illustrative and not restrictive. It is therefore understood that numerous unillustrated modifications can be devised without departing from the scope of the invention.

EXPLANATION OF REFERENCE SIGNS

100 Vehicle control apparatus, 10 Target track generation apparatus, 1 Preceding vehicle position acquisition unit, 2 Subject vehicle state quantity acquisition unit, 3 Subject vehicle movement amount calculator, 4 Subject vehicle reference preceding vehicle position calculator, 5 Target track generator, 6 Target track correction determination unit, 7 Correction target track generator, 8 Controller, 6a Preceding vehicle straight travel determination unit, 6b Inter vehicle distance determination unit, 6c Target track difference determination unit.

The invention claimed is:

1. A target track generation apparatus comprising:
a processor to execute a program; and
a memory to store the program which, when executed by the processor, performs processes of:
    acquiring a relative position of a preceding vehicle traveling in front of a subject vehicle;
    acquiring a state quantity of the subject vehicle;
    calculating a movement amount of the subject vehicle, based on the state quantity of the subject vehicle;
    calculating a point group of subject vehicle reference preceding vehicle positions representing a history of the relative position of the preceding vehicle in a coordinate system using a current position of the subject vehicle as a reference, based on the relative position of the preceding vehicle and the movement amount of the subject vehicle;
    generating a target track of the subject vehicle, based on the point group of the subject vehicle reference preceding vehicle positions;
    determining whether or not correction of the target track is necessary, based on the point group of the subject vehicle reference preceding vehicle positions or the target track; and
    generating a correction target track obtained by correcting the target track, based on the point group of the subject vehicle reference preceding vehicle positions or the target track, when it is determined that correction of the target track is necessary, wherein
the processor generates the target track by performing polynomial approximation on the point group of the subject vehicle reference preceding vehicle positions, and
the processor generates the correction target track by lowering a degree of the polynomial approximation used to generate the target track.

2. The target track generation apparatus according to claim 1, wherein
the processor generates the correction target track by setting a term of a high degree of a polynomial representing the target track to 0.

3. The target track generation apparatus according to claim 1, wherein
the processor determines whether or not the preceding vehicle is traveling straight, and when the processor determines that the preceding vehicle is traveling straight, the processor determines that correction of the target track is necessary.

4. The target track generation apparatus according to claim 1, wherein
the processor determines that correction of the target track is necessary when an inter vehicle distance between the subject vehicle and the preceding vehicle is smaller than a predetermined threshold.

5. A target track generation apparatus comprising:
a processor to execute a program; and
a memory to store the program which, when executed by the processor, performs processes of:
   acquiring a relative position of a preceding vehicle traveling in front of a subject vehicle:
   acquiring a state quantity of the subject vehicle;
   calculating a movement amount of the subject vehicle, based on the state quantity of the subject vehicle;
   calculating a point group of subject vehicle reference preceding vehicle positions representing a history of the relative position of the preceding vehicle in a coordinate system using a current position of the subject vehicle as a reference, based on the relative position of the preceding vehicle and the movement amount of the subject vehicle;
   generating a target track of the subject vehicle, based on the point group of the subject vehicle reference preceding vehicle positions;
   determining whether or not correction of the target track is necessary, based on the point group of the subject vehicle reference preceding vehicle positions or the target track; and
   generating a correction target track obtained by correcting the target track, based on the point group of the subject vehicle reference preceding vehicle positions or the target track, when it is determined that correction of the target track is necessary, wherein
the processor determines a magnitude of a difference between the two target tracks, and when the difference between the two target tracks is equal to or less than a predetermined threshold, the processor determines that correction of the target track is necessary,
the two target tracks comprise the correction target track and the target track, and
the correction target track comprises a lower degree than the target track.

6. The target track generation apparatus according to claim 5, wherein
the two target tracks are track obtained by performing any of linear approximation, quadratic approximation, and cubic approximation.

7. A vehicle control apparatus comprising:
the target track generation apparatus according to claim 5; and
a controller configured to control operation of the subject vehicle, based on the target track or the correction target track.

8. A vehicle control apparatus comprising:
the target track generation apparatus according to claim 1; and
a controller configured to control operation of the subject vehicle, based on the target track or the correction target track.

9. A target track generation method comprising:
acquiring a relative position of a preceding vehicle traveling in front of a subject vehicle;
acquiring a state quantity of the subject vehicle;
calculating a movement amount of the subject vehicle, based on the state quantity of the subject vehicle;
calculating a point group of subject vehicle reference preceding vehicle positions representing a history of the relative position of the preceding vehicle in a coordinate system using a current position of the subject vehicle as a reference, based on the relative position of the preceding vehicle and the movement amount of the subject vehicle;
generating a target track of the subject vehicle, based on the point group of the subject vehicle reference preceding vehicle positions;
determining whether or not correction of the target track is necessary, based on the point group of the subject vehicle reference preceding vehicle positions or the target track; and
generating a correction target track obtained by correcting the target track, based on the point group of the subject vehicle reference preceding vehicle positions or the target track, when it is determined that correction of the target track is necessary, wherein
the target track is generated by performing polynomial approximation on the point group of the subject vehicle reference preceding vehicle positions, and
the correction target track is generated by lowering a degree of the polynomial approximation used to generate the target track.

10. The target track generation method according to claim 9, wherein
the correction target track is generated by setting a term of a high degree of a polynomial representing the target track to 0.

11. The target track generation method according to claim 9, wherein
correction of the target track is determined to be necessary when the preceding vehicle is determined to be traveling straight.

12. The target track generation method according to claim 9, wherein
correction of the target track is determined to be necessary when an inter vehicle distance between the subject vehicle and the preceding vehicle is smaller than a predetermined threshold.

13. A target track generation method comprising:
acquiring a relative position of a preceding vehicle traveling in front of a subject vehicle;
acquiring a state quantity of the subject vehicle;
calculating a movement amount of the subject vehicle, based on the state quantity of the subject vehicle;
calculating a point group of subject vehicle reference preceding vehicle positions representing a history of the relative position of the preceding vehicle in a coordinate system using a current position of the subject vehicle as a reference, based on the relative position of the preceding vehicle and the movement amount of the subject vehicle;
generating a target track of the subject vehicle, based on the point group of the subject vehicle reference preceding vehicle positions;
determining whether or not correction of the target track is necessary, based on the point group of the subject vehicle reference preceding vehicle positions or the target track; and generating a correction target track obtained by correcting the target track, based on the point group of the subject vehicle reference preceding vehicle positions or the target track, when it is determined that correction of the target track is necessary, wherein two target tracks having different degrees are generated by performing two polynomial approximations having different degrees on the point group of the subject vehicle reference preceding vehicle positions, correction of the target track is determined to be necessary when the difference between the two target tracks is equal to or less than a predetermined threshold, the two target tracks comprise the correction target track and the target track, and the correction target track comprises a lower degree than the target track.

14. The target track generation method according to claim 13, wherein the two target tracks are obtained by performing any of linear approximation, quadratic approximation, and cubic approximation.

15. A vehicle control method comprising:

generating the target track or the correction target track by using the target track generation method according to claim 9; and controlling operation of the subject vehicle, based on the target track or the correction target track.

16. A vehicle control method comprising:

generating the target track or the correction target track by using the target track generation method according to claim 13; and controlling operation of the subject vehicle, based on the target track or the correction target track.

* * * * *